Feb. 3, 1925.

L. T. THORN

LICENSE TAG HOLDER FOR VEHICLES

Filed Jan. 29, 1924 2 Sheets-Sheet 1

1,524,848

L. T. Thorn,
Inventor

By  
Attorney

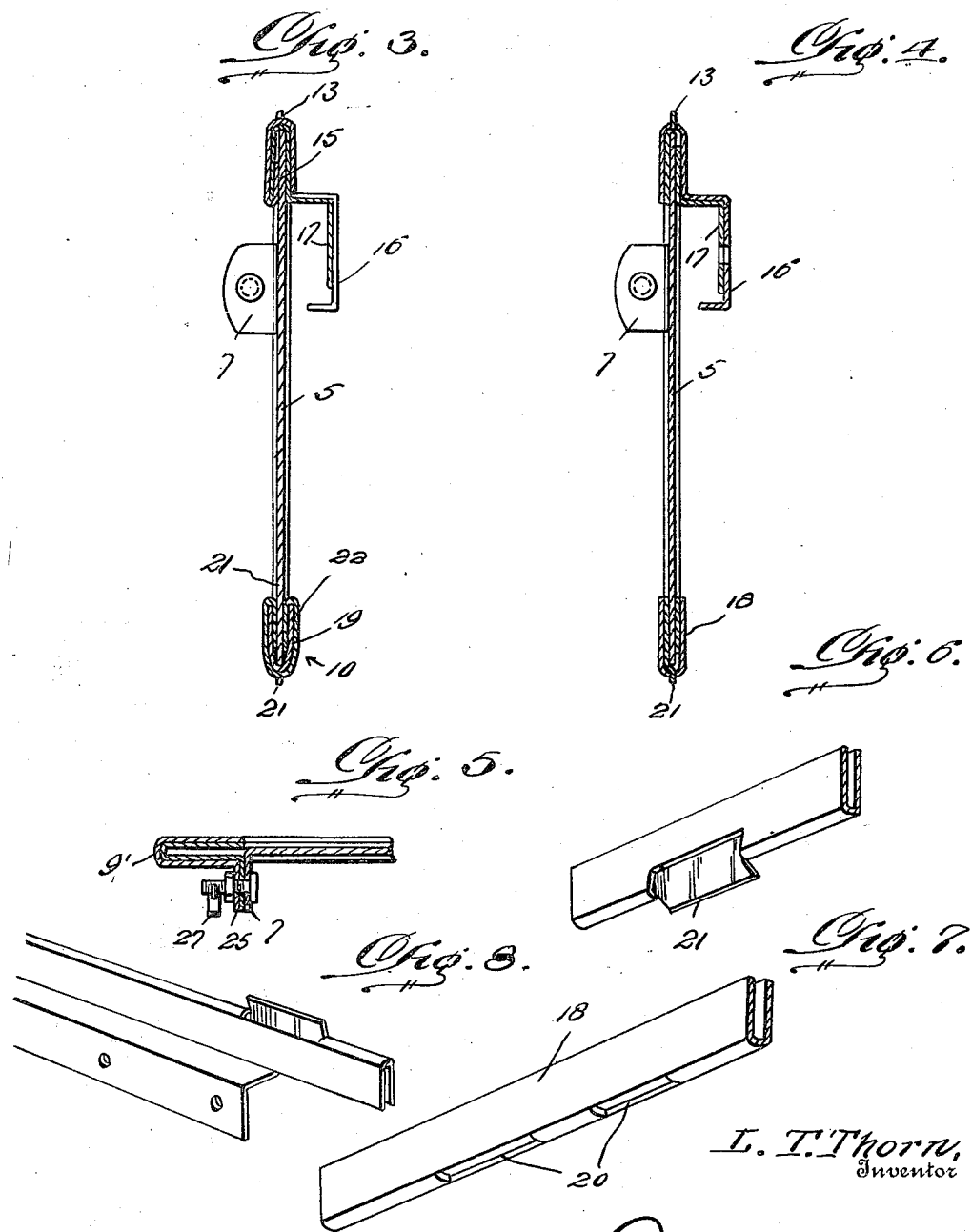

Patented Feb. 3, 1925.

1,524,848

UNITED STATES PATENT OFFICE.

LAWRENCE T. THORN, OF HARRISBURG, ARKANSAS.

LICENSE-TAG HOLDER FOR VEHICLES.

Application filed January 29, 1924. Serial No. 689,281.

*To all whom it may concern:*

Be it known that I, LAWRENCE T. THORN, a citizen of the United States, residing at Harrisburg, in the county of Poinsett and State of Arkansas, have invented certain new and useful Improvements in License-Tag Holders for Vehicles, of which the following is a specification.

This invention relates to holders for vehicle license tags and has for its primary object to provide a holder that is primarily adapted for the reception of a license tag constructed in accordance with my invention shown and described in co-pending application Serial No. 628,111, filed March 27, 1923.

One of the main objects of the present invention resides in the provision of a holder wherein the length of the same may be increased or diminished at will, for maintaining license tags of varying lengths and wherein the holder may be knocked down or set up when it is necessary to remove or position a tag with respect to the holder.

A still further object of the invention is to substantially improve and simplify over the form of license tag holder shown and described in my co-pending application bearing Serial No. 628,111 filed March 27, 1923.

With the foregoing and other objects in view, as the nature of the invention will be better understood, the same comprises the novel form, combination and arrangement of parts hereinafter more fully described, shown in the accompanying drawings and claimed.

Figure 1:
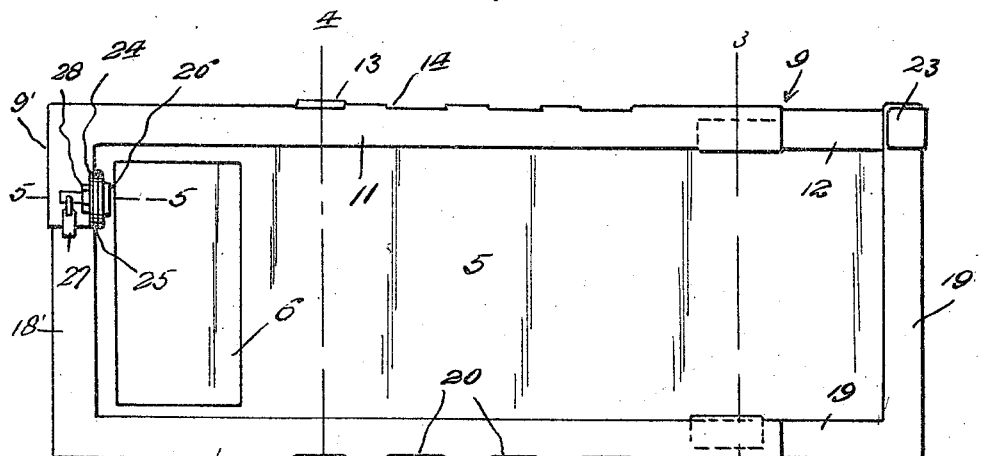
Figure 2:
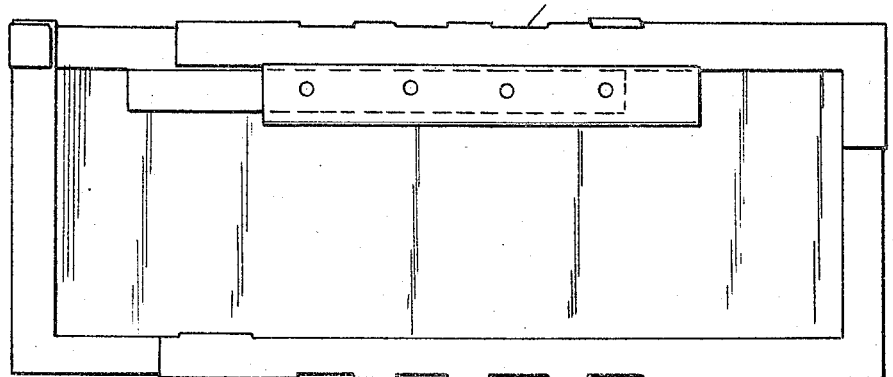
Figure 9:
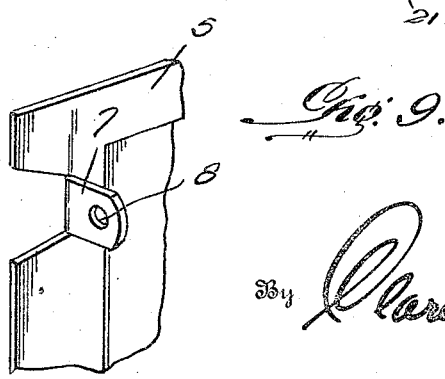

In the drawings wherein like reference characters indicate corresponding parts throughout the different views, Figure 1 is a front elevational view of a license tag positioned within a holder constructed in accordance with the present invention, Figure 2 is a rear elevational view thereof, Figures 3 and 4 are detail vertical sectional views taken substantially upon the lines 3—3 and 4—4 respectively of Figure 1, Figure 5 is a detail fragmentary longitudinal sectional view taken substantially upon the line 5—5 of Figure 1, for more clearly disclosing the locking means between the upper and lower sections of the holder as well as the tag member, Figure 6 is a fragmentary perspective of one of the members included in the lower holder section, Figure 7 is a similar view of the other member of the lower holder section, Figure 8 is a fragmentary perspective view of one of the members of the upper holder section, and Figure 9 is a perspective view of one end of the form of license tag employed in conjunction with the present invention.

Now having particular reference to the drawings, 5 indicates generally a license tag of the type substantially similar to that shown and described in my co-pending application Serial No. 621,251 filed February 26, 1923. As clearly set forth in this co-pending application, said license tag 5 is provided adjacent one end with a substantially rectangular shaped opening 6 within which is to be removably disposed a year plate, not shown. This tag is further provided at the edge adjacent said opening 6 with a forwardly bent ear or lug 7 that is provided with an opening 8.

The present holder that is primarily adapted for the reception of the form of license tag above set forth comprises an upper and lower section designated generally 9 and 10.

The upper holder section 9 comprises a pair of co-operating sheet metal channel bars 11 and 12, each of which are of substantially inverted U-shape in cross section as clearly shown in the sectional views 3 and 4. The channel bar 12 is adapted for free sliding movement within the channel bar 11 and said first mentioned channel bar 12 is formed at a point adjacent its inner end and upon its top-side with a struck-out relatively long lug 13 that is adapted for the selective reception within any one of a plurality of cutouts 14 in the upper edge of the sheet metal channel bar 11.

At the end of the channel bar 11 the same is provided upon its front portion with an upwardly bent ear 15 that engages within the channel of the bar 12 for providing a guide for this bar during the sliding movement of the same with respect to the channel bar 11, and it will of course be obvious that by changing the position of the lug 13 within the opening 14 of the channel bar 11 the length of the upper section 9 may be increased or diminished at will.

Formed upon the lower edge of the rear side of the channel bar 11 is a channel bracket 16 of a length slightly less than the length of said channel bar 11 and within which is slidable a bracket plate 17 formed upon and in spaced relation to the channel bar 12, this bracket plate 17 and channel bracket 16 providing a means whereby the holder may be rigidly secured to a license tag bracket of a motor vehicle, it being of course understood that the members 16 and 17 are provided with a plurality of openings adapted for registration at the different adjusted positions of the channel bars 11 and 12 with respect to each other, whereby the same may be secured to the license tag bracket through the medium of bolts or other suitable securing means.

The lower holder section 10 is constructed in a manner substantially similar to the construction of the upper section 9, the same comprising a pair of inter-fitting channel bars 18 and 19, respectively, which are of sheet metal and are substantially U-shaped in cross section. The lower edge of the channel bar 18 is formed with a plurality of spaced openings 20 for the selective reception of a struck-out lug 21 upon the closed edge of the channel bar 19. Similarly to the construction of the uppermost section 9 the outer portion of the channel bar 18 is formed adjacent its inner end with an inwardly extending lug 21 that engages within the channel of the bar 19. In this instance, the rear side of the channel bar 18 is formed with an additional inwardly extending lug 22 that also engages within the channel of the bar 19 and serves as a means for preventing the lateral displacement of the bar members with respect to each other.

The outer ends of the bar sections 18 and 19 are each formed with a vertically extending portion 18' and 19', respectively. The portion 19' is slightly greater than the portion 18' and is adapted for interlocking engagement with the adjacent end of the section 9 in a manner similar to the connection between the upper and lower portions of the tag holder shown and described in my said co-pending application, Serial No. 628,111 filed March 27, 1923, this connection being indicated generally at 23.

The outer end of the channel bar 11 of the uppermost section 9 is formed with a pendant portion 9' of channel shape for the reception of the upper end of a channel shaped portion 18' of the channel bar 18 of the lowermost holder section 10.

At the inner edge of the portions 9' and 18' of the members of the sections 9 and 10, respectively, the same are formed with mating ears 24 and 25 that lie adjacent the ear 7 of the license tag 5 when the holder is positioned around said tag. These ears 24 and 25 are formed with openings for registration with the opening in the ear 7 whereby a bolt 26 may be engaged therethrough. This bolt is screw-threaded at one end and also provided with a slot at this end for the reception of a suitable seal 27 after a locking nut 28 has been screwed onto said bolt, it being obvious that by the sealing of the upper and lower sections as well as the tag 5 together the chances of anyone tampering with the license tag will be reduced to a minimum, and therefore there will be little or no liability of the vehicle equipped with a tag and holder of this character being stolen.

From the foregoing it will be apparent that I have provided a highly novel and useful form of holder for license tags of the character shown and described, and even though I have herein set forth the most practical embodiment of the invention with which I am at this time familiar, it is nevertheless to be understood that minor changes may be made within the invention without departing from the spirit and scope of the appended claims.

Having thus described my invention, what I claim as new and desire to secure by Letters Patent is:—

1. In a license tag holder of the character described, a frame including an upper and lower section each of which includes a pair of co-operating channel bar members, means for securing each pair of members in adjusted relation with each other, channel legs extending upwardly from the outer ends of the bar members of the lower section, and means for securing said sections together whereby the license tag is retained in the frame.

2. In a license tag holder of the character described, a frame including an upper and lower section each of which includes a pair of co-operating channel bar members, means for securing each pair of members in adjusted relation with each other, channel legs extending upwardly from the outer ends of the bar members of the lower section, means for securing said sections together whereby the license tag is retained in the frame, and co-operative means formed upon the bar members of one of the sections for providing an attachment bracket for the holder.

3. In a license tag holder of the character described, a frame including an upper and lower section each of which includes a pair of co-operating channel bar members, cooperating means carried by each pair of bar members for securing the same in adjusted relation with each other, upwardly directed channel legs upon the outer ends of the bar members of the lower sections, a quickly detachable connection between one of said channel legs and the adjacent end of the upper section, and means for securing the other end of the upper section to the adjacent channel leg of the lower section.

4. In a license tag holder of the character described, a frame including an upper and lower section each of which includes a pair of co-operating channel bar members, cooperating means carried by each pair of bar members for securing the same in adjusted relation with each other, upwardly directed channel legs upon the outer ends of the bar members of the lower sections, a quickly detachable connection between one of said channel legs and the adjacent end of the upper section, means for securing the other end of the upper section to the adjacent channel leg of the lower section, said means also serving to connect the tag to the holder.

5. A license tag holder including an open frame, having upper and lower frame members formed of channel sections for receiving and retaining the license tag therein, said members being formed for removable interlocking connection to permit the insertion or removal of the tag, each member being formed of interfitting sections having adjustable connections interlocked in frame forming relation, and means on one of said members adapted to be secured to the bracket for mounting the holder.

6. A license tag holder comprising an open frame, having a pair of frame forming members disengageably connected at one end, said members being formed of a pair of interfitting channel sections relatively adjustable in open position, and interlocked in closed tag holding relation, and means for holding the other end of said frame members together.

7. A license tag holder comprising an open frame, having a pair of frame forming members disengageably connected at one end, said members being formed of a pair of interfitting channel sections relatively adjustable in open position and interlocked in closed tag holding relation, means for holding the other end of said frame members together, and projections having offset end portions formed on each of the sections of one of the frame members, the offset portions being provided with openings adapted to register in set positions of adjustment, for providing a means whereby a holder may be secured to a vehicle.

In testimony whereof I affix my signature.

LAWRENCE T. THORN.